Dec. 15, 1959 R. C. CURTIS ET AL 2,917,578

PULSE-CODE-COMMUNICATION SYSTEM

Filed March 30, 1953 2 Sheets-Sheet 1

Dec. 15, 1959 R. C. CURTIS ET AL 2,917,578

PULSE-CODE-COMMUNICATION SYSTEM

Filed March 30, 1953 2 Sheets-Sheet 2

United States Patent Office 2,917,578

Patented Dec. 15, 1959

2,917,578

PULSE-CODE-COMMUNICATION SYSTEM

Richard C. Curtis, Old Westbury, and Paul Nosal, Levittown, N.Y., assignors to Hazeltine Research, Inc., Chicago, Ill., a corporation of Illinois Application March 30, 1953, Serial No. 345,564

23 Claims. (Cl. 178—17)

*General*

Figure 1:
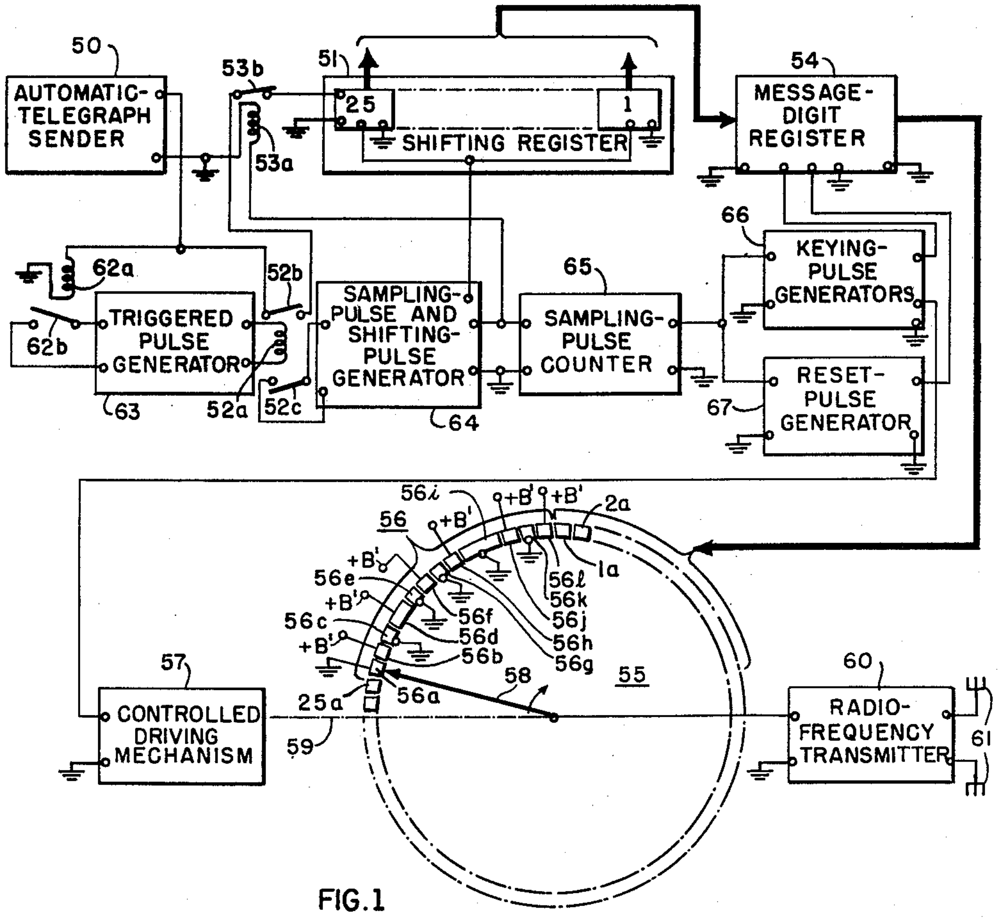

This invention relates to pulse-code-communication systems and, more particularly, to synchronizing apparatus for such systems. The invention is especially useful in connection with automatic-telegraph equipment and, accordingly, will be described in that environment.

One previously known type of automatic-telegraph equipment utilizes a manually operated automatic-telegraph sender which develops electrical binary-permutation-code message-pulse groups individually representative of discrete message symbols. In another type of automatic-telegraph equipment, message pulses are developed in the form of holes punched in a tape which may be utilized later with suitable tape-responsive equipment to develop electrical binary-permutation-code pulses representative of the punched holes and, thus, of the message symbols.

The electrical binary-permutation-code message pulses developed by either type of equipment may be applied as modulation information to a conventional radio-frequency transmitter for developing radio-frequency pulses in accordance therewith for transmission to suitable receiving equipment which responds to the transmitted pulses for reproducing the discrete message symbols. To ensure synchronization of the automatic-telegraph sender and printer of the transmitting and receiving equipment, respectively, synchronizing pulses are ordinarily transmitted with the message-pulse groups. During the transmission of the synchronizing pulses and message pulses from the transmitter to the receiving equipment, noise disturbances, caused for example by atmospheric conditions, may distort the synchronizing pulses by, for example, canceling a transmitted synchronizing pulse or by adding a pulse in a space between synchronizing pulses. Such distortions of the synchronizing pulses cause loss of synchronization and consequent error in the reproduction of one or more discrete message symbols represented by the message-code pulse groups.

One type of automatic-telegraph equipment heretofore proposed utilizes a minimum of a 7½ digit code to represent each message symbol and corresponding synchronizing information. More particularly, 5 digits represent the message symbol and each group of 5 digits is preceded by a start-synchronizing digit and followed by a stop-synchronizing pulse of at least 1½ digits duration. In such a system it is possible to transmit a maximum of $2^5$ or 32 message-digit permutations individually to represent discrete message symbols. By "message symbols" is meant, for example, letters of the alphabet, numbers, and miscellaneous control symbols for operating the printer of the receiving equipment. A typical digital element duration for such a system is about 22 milliseconds and a normal maximum operating speed is about 60 5-letter words per minute.

It has been found that a high percentage of the errors occurring in the message-code and synchronizing digits translated by automatic-telegraph equipment of the type just described occurs as the result of not more than one error every 37½ digits. In other words, this error rate, which may be considered as a maximum rate, corresponds to a rate of one error every 5 message symbols or letters. Moreover, when an error occurs in a synchronizing digit, the equipment may fail to reproduce several successive message symbols before synchronization is restored. Accordingly, it is proposed in accordance with the present invention, to employ equipment which translates a 39-digit signal comprising a group of 25 message-code digits, representing 5 message symbols, and a single 14-digit synchronizing signal. This 39-digit signal is subject to approximately the same maximum error rate as the 37½ digit signal mentioned above because both signals include approximately the same number of digits. Similarly, the individual error rates in the message-code digits and the synchronizing digits are approximately the same as the corresponding rates affecting the 37½ digit signal. Synchronization can be greatly improved, however, by utilizing a synchronizing signal which effects synchronization notwithstanding one digital error therein caused by noise degradation during transmission. In this manner, there is eliminated a high percentage of the errors in the reproduction of message symbols due to loss of synchronization.

It is an object of the present invention, therefore, to provide a new and improved pulse-code-communication system for translating message-code pulses representative of discrete message symbols and for reproducing the symbols which avoids one or more of the above-mentioned disadvantages and limitations of such systems heretofore proposed.

It is another object of the invention to provide a new and improved pulse-code-transmitting system for transmitting message-code pulses representative of discrete message symbols.

It is another object of the invention to provide a new and improved pulse-code-receiving system for receiving message-code pulses representative of discrete message symbols and for reproducing the symbols.

It is another object of the invention to provide a new and improved pulse-code-communication system for translating message-code pulses representative of discrete message symbols and for reproducing the symbols and having improved sending-receiving synchronizing apparatus.

It is still another object of the invention to provide a new and improved pulse-code-communication system for translating message-code pulses representative of discrete message symbols and for reproducing the symbols and having improved sending-receiving synchronizing apparatus and capable of operating in conjunction with conventional automatic-telegraph sending and printing equipment.

It is another object of the invention to provide a new and improved pulse-code-communication system for translating as a single group message-code pulses representative of a plurality of discrete message symbols and for reproducing the symbols and ultilizing an improved synchronizing signal which results in reduced loss of synchronization due to noise degradation during transmission.

It is another object of the invention to provide a new and improved pulse-code-communication system for translating message-code pulses representative of discrete message symbols and for reproducing the symbols and utilizing, for synchronization of a group of message pulses representative of a plurality of such symbols, a plural-digit-synchronizing signal which is capable of effecting synchronization notwithstanding one digit error therein.

It is another object of the present invention to provide, for a pulse-code-communication system for translating message-code pulses representative of discrete message symbols and for reproducing the symbols, new and improved synchronizing apparatus for effecting synchronization of pulses representative of a plurality of such symbols notwithstanding error in part of the synchronizing signal utilized thereby.

In accordance with a particular form of the invention, a pulse-code-transmitting system for transmitting message-code pulses representative of discrete message symbols comprises a pulse coder for developing plural-digit message-code pulse groups individually representative of the symbols and pulse-storage means responsive to the pulse coder for storing message-code digits in a predetermined plurality of the aforesaid groups. The pulse-code-transmitting system also includes digit-scanning means responsive to the pulse-storage means for sequentially deriving therefrom all the message-code digits of the aforesaid stored groups for transmission as a single collective group and in a predetermined digital order, and synchronizing-signal generating means coupled to the scanning means for generating the same synchronizing-pulse group for transmission with each transmitted collective group of message-code digits.

Also in accordance with the invention, a pulse-code-receiving system for receiving a transmitted signal representing a synchronizing-pulse group and message-code pulses representative of discrete message symbols comprises a code-pulse circuit for receiving the transmitted signal and first pulse-storage means coupled to the receiving circuit for storing the synchronizing-pulse group. The receiving system also includes means responsive to the stored synchronizing-pulse group for developing a timing-control signal and second pulse-storage means effectively responsive to the timing-control signal and coupled to the receiving circuit for storing a predetermined plurality of plural-digit message-code pulse groups individually representative of the aforesaid symbols. The receiving system further includes pulse-decoding means responsive to the aforesaid message-code pulse groups for reproducing the symbols.

Also in accordance with the invention, a pulse-code-communication system for translating message-code pulses representative of discrete message symbols and for reproducing the symbols comprises a pulse-code-transmitting system and a pulse-code-receiving system of the types described.

Also in accordance with the invention, in a pulse-code-transmitting system for transmitting a group of message-code digits representative of discrete message symbols, a synchronizing-signal generator comprises first signal-generating means for generating the first part of a two-part synchronizing signal comprising a first pulse group of nonintegral digital formation and distinguishable from the aforesaid group of message-code digits, and second signal-generating means for generating the second part of the synchronizing signal comprising a second pulse group of nonintegral digital formation and distinguishable from the first pulse group and from the aforesaid group of message-code digits. The synchronizing-signal generator also includes actuating means coupled to the first and second signal-generating means for timing the operation thereof to effect the generation of the aforesaid synchronizing signal prior to the transmission of the aforesaid group of message-code digits.

Also in accordance with the invention, in a pulse-code-receiving system for receiving a transmitted signal representing message-code pulses representative of discrete message symbols and a two-part synchronizing signal, the parts individually comprising pulse groups distinguishable from each other and from the message-code pulses, and subject to noise degradation during transmission, a synchronizing-signal recognizer comprises terminals for supplying the transmitted signal and first pulse-storage means coupled to the terminals for storing the aforesaid synchronizing-pulse groups. The synchronizing-signal recognizer also includes means responsive to either of the stored synchronizing-pulse groups upon degradation of the other for developing a timing-control signal and second pulse-storage means responsive to the timing-control signal and coupled to the aforesaid terminals for storing a predetermined plurality of plural-digit message-code pulse groups individually representative of the aforesaid symbols. The synchronizing-signal recognizer also includes pulse-decoding means responsive to the aforesaid message-code pulse groups for reproducing the aforesaid symbols.

For a better understanding of the present invention, together with other and further objects thereof, reference is had to the following description taken in connection with the accompanying drawings, and its scope will be pointed out in the appended claims.

Figure 1A:
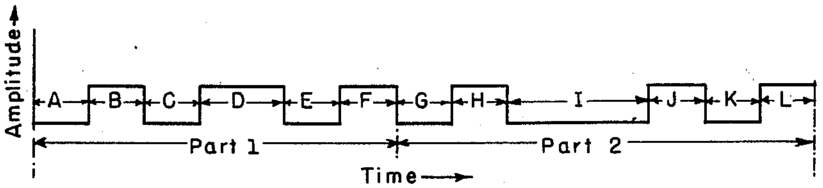
Figure 1B:
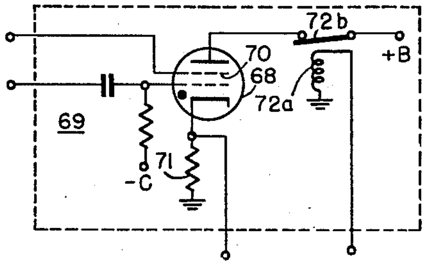
Figure 2:
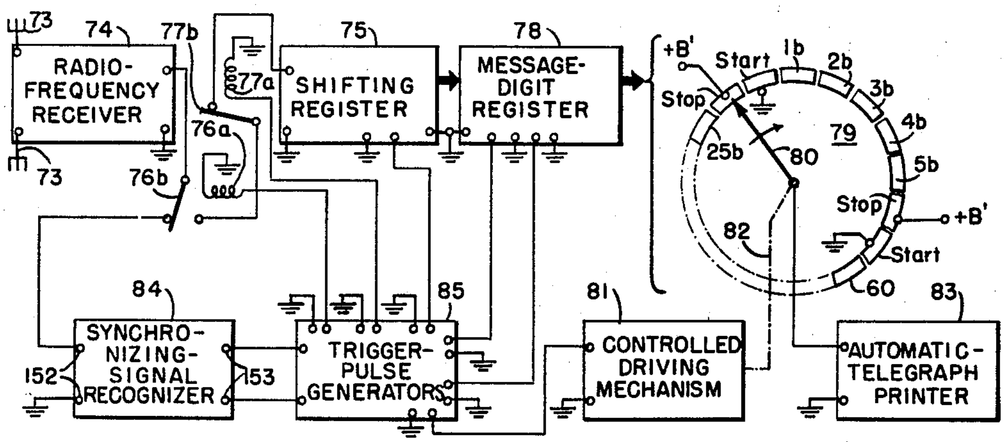
Figure 3:
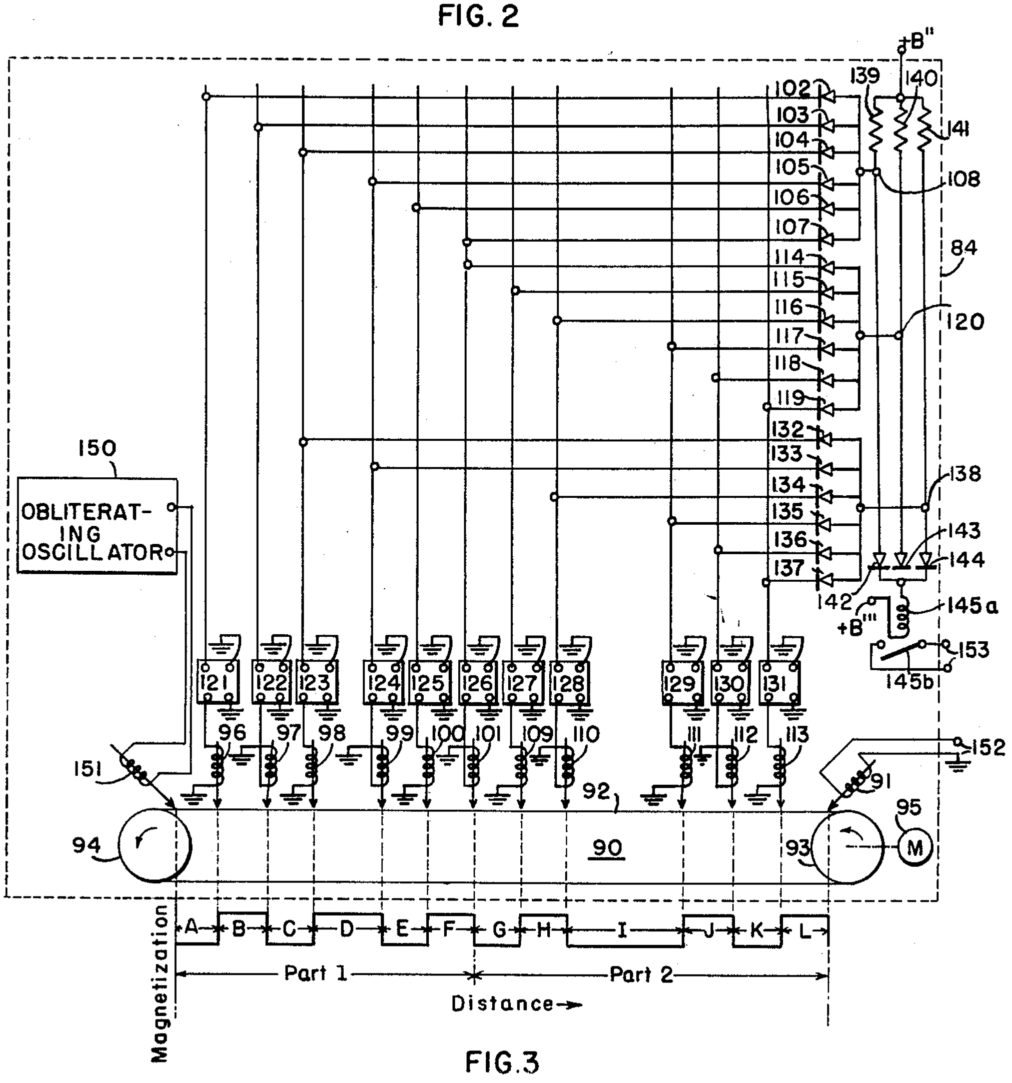

In the accompanying drawings:

Fig. 1 is a circuit diagram, partly schematic, of a pulse-code-transmitting system constructed in accordance with the invention;

Fig. 1*a* is a graph representing the amplitude-time characteristic of a synchronizing signal developed by the Fig. 1 equipment;

Fig. 1*b* is a detailed circuit diagram of a portion of the Fig. 1 system;

Fig. 2 is a circuit diagram, partly schematic, of a pulse-code-receiving system constructed in accordance with the invention, and Fig. 3 is a circuit diagram, partly schematic, of a synchronizing-signal recognizer constructed in accordance with the invention and incdluded in the Fig. 2 equipment and includes a graph representing a magnetization-distribution characteristic of a portion of the synchronizing-signal recognizer.

*Description of Fig. 1 pulse-code-transmitting system*

Referring now, more particularly, to Fig. 1 of the drawings, there is represented a pulse-code-transmitting system for transmitting message-code pulses representative of discrete message symbols comprising a pulse coder for developing plural-digit message-code pulse groups individually representative of the symbols. The pulse coder comprises, for example, a conventional manually actuated automatic-telegraph sender 50 for sequentially developing binary-permutation-code 5-digit electrical message-pulse groups. The automatic-telegraph sender also includes means for developing start-stop synchronizing digits for each of the message-code pulse groups. A suitable automatic-telegraph sender of this type is described at pages 18–26 and 18–27 of "Electrical Engineers' Handbook," Electric Communication and Electronics, Pender and McIlwain—Editors, Fourth Edition, John Wiley & Sons, 1950.

The pulse-code-transmitting system also includes pulse-storage means responsive to the pulse coder for storing message-code digits in a predetermined plurality of the aforesaid groups. The pulse-storage means comprises, for example, a shifting register 51 of conventional construction having an input circuit coupled during operation of the equipment to the output circuit of the automatic-telegraph sender 50 through a normally open relay contact **52*b* and a normally closed relay contact 53*b*. More particularly, the shifting register 51 preferably comprises 25 pulse-storage circuit units coupled to the automatic-telegraph sender 50 for individually storing preferably 25 digits of 5 message-pulse groups. Circuit units 1 and 25 are diagrammatically represented in the drawings, but it will be understood that the 25 circuit units are coupled in cascade with individual output circuits, as indicated for the units 1 and 25. The shifting register 51** may be, for example, of the type described in an article entitled "Gate-Type Shifting Register" by Knapton and Stevens, "Electronics," December 1949.

The 25 circuit units of the shifting register 51 are individually connected to 25 circuit units of a message-digit register 54 for storing 25 message digits previously stored by the shifting register 51. For clarity, a single heavy-line arrow is used to indicate the several connections between the units 51 and 54. Plural connections between other units shown in the drawings are indicated in a similar manner. The storage units of the message-digit register 54 are of a well-known type and will be described in detail hereinafter.

The pulse-code-transmitting system also includes digit-scanning means responsive to the pulse-storage means including the register 54 for sequentially deriving therefrom message-code digits of the stored groups for transmission as a single group and in a predetermined digital order. This digit-scanning means comprises elements of a scanner 55 represented for simplicity as a mechanical scanner but having well-known suitable electrical equivalents. The digit-scanning means includes segments 1a–25a, inclusive, shown in part in the drawings, which are individually connected to the 25 storage units of the message-digit register 54 and are individually numbered according to the digital positions of the message digits applied thereto by the register 54. The scanner segments 1a–25a, inclusive, for example, will be considered to be arranged in consecutive order, although any selected order would be satisfactory.

The scanner 55 also includes 12 additional segments 56 alternately connected to the positive and negative terminals of a source of positive potential +B′ for developing suitable synchronizing pulses to be considered in detail hereinafter. The scanner may be operated by any suitable means such as a controlled driving mechanism 57 of conventional construction connected to the movable arm 58 of the scanner, as indicated by a broken line 59. The output circuit of the scanner 55 is connected to a modulation input circuit of a radio-frequency transmitter 60 of, for example, the frequency-shift modulation type and of conventional construction for developing a radio-frequency signal having a frequency which shifts from one value to another in accordance with the synchronizing pulses and message-code pulses applied thereto by the scanner 55. An antenna 61, 61 of a conventional type is coupled to the transmitter 60.

The pulse-code-transmitting system also includes pulse-generating circuit means coupled to the automatic-telegraph sender 50 and responsive to the synchronizing pulses developed thereby for generating control pulses for triggering the shifting register 51 in synchronism with the development of each of the message-code pulses and for triggering the message-digit register 54 and the scanner 55 in synchronism with the development of each group of, for example, 25 message-code digits. The pulse-generating circuit means comprises a normally energized relay winding 62a connected across the output circuit of the automatic-telegraph sender 50 and having an associated normally open relay contact 62b. The relay contact 62b is connected to the input circuit of a triggered pulse generator 63 for generating a delayed output gating pulse having a duration corresponding to 5 digits of the output signal of the automatic-telegraph sender 50 in response to each start-synchronizing digit developed by the sender 50. The triggered pulse generator 63 may comprise, for example, a triggered one-pulse multivibrator, such as that described at page 9–18 of the above-mentioned "Electrical Engineers' Handbook" and may include a suitable time-delay output circuit. The output circuit of the triggered pulse generator 63 is connected to a normally de-energized relay winding 52a having normally open contacts 52b and 52c associated therewith. The contact 52c is connected to a sampling-pulse and shifting-pulse generator 64 comprising, for example, a free-running multivibrator, such as described at pages 586 and 587 of the text "Radio Engineering," Third Edition, by F. E. Terman, McGraw-Hill, 1947, but operative only during the interval of the output gating pulse of the generator 63 when the relay contact 52c is closed.

The shifting-pulse output circuit of the generator 64 comprising one multivibrator output circuit is connected to an input circuit of the shifting register 51 for applying a shifting pulse thereto to shift each message digit stored by a given storage unit to the next storage unit. The sampling-pulse output circuit of the generator 64 comprising another multivibrator output circuit is connected to a relay winding 53a which controls the relay contact 53b, closing that contact during an interval of each message digit developed by the automatic-telegraph sender 50. The sampling-pulse output circuit is also connected to a sampling-pulse counter 65 of conventional construction for counting groups of preferably 25 sampling pulses each and for supplying an output trigger pulse for each such group. The counter 65 may comprise, for example, a counter of the type represented in Fig. 1 at page 9–13 of the above-mentioned "Electrical Engineers' Handbook."

The output circuit of the sampling-pulse counter 65 is also connected to the synchronizing input circuits of keying-pulse generators 66 and reset-pulse generator 67 of conventional construction. These pulse generators may individually comprise, for example, a number of triggered relaxation oscillators, such as that described at page 9–21 of the above-mentioned "Handbook," for generating output pulses at predetermined times. The output circuits of the keying-pulse generators 66 are connected to the message-digit register 54 and the controlled driving mechanism 57 for keying those units at the proper times while the output circuit of the reset-pulse generator 67 is connected to the message-digit register 54 for resetting the circuits of the register to reference operating conditions at predetermined times.

*Operation of Fig. 1 pulse-code-transmitting system*

As an operator types a message on the keyboard of the automatic-telegraph sender 50, the sender 50 develops electrical message pulses in a usual manner. Each discrete message symbol is represented by a 5-digit message-pulse group preceded by a start-synchronizing digit and followed by a stop-synchronizing digit. Each start-synchronizing digit comprises the absence of a pulse or space and de-energizes the relay 62a to control the synchronizing circuits 63–67, inclusive, in a manner explained subsequently. Each stop-synchronizing digit comprises a pulse which energizes the relay 62a until the arrival of the next start-synchronizing digit.

In response to each start-synchronizing digit, certain of the synchronizing circuits 63–67, inclusive, energize the relay winding 52a, closing the relay contacts 52b and 52c for a predetermined time interval. Also, the relay winding 53a is initially de-energized and is thereafter energized during a portion of the interval of each message digit developed by the automatic-telegraph sender 50. During the periods of energization of the relay winding 53a, the relay contact 53b is closed, thereby coupling the automatic-telegraph sender 50 to the pulse-storage unit 25 of the shifting register 51 through the relay contact 52b during a portion of each message-digit interval.

The first message digit applied to the pulse-storage unit 25 of the shifting register 51 comprises a pulse or a space which the unit 25 temporarily stores. Each of the storage units of the shifting register 51 has one operating condition representing a stored pulse and another operating condition representing the absence of a stored pulse or a stored space. In response to the operation of the synchronizing circuits, the shifting register 51 shifts the message digits stored by the unit 25 to the unit 24 prior to the application of the second message digit to the unit 25 and at the same time restores the unit 25 to its reference operating condition. The unit 25 then stores the second message digit applied thereto by the automatic-telegraph sender 50 upon the closing of the relay contact 53b.

Similarly, during the interval between the application of the second message digit to the unit 25 and the third message digit thereto, the shifting register 51 transfers the first message digit stored in the unit 24 to the unit 23 and the second message digit stored in the unit 25 to the unit 24. At the same time, the unit 25 is restored to its reference operating condition for receiving the third message digit.

The shifting register 51 operates in a manner similar to that just explained for storing the fourth and fifth message digits representing, in conjunction with the first three message digits, the first discrete message symbol or letter typed by the operator. Accordingly, the 5 message digits representing the first discrete message symbol are stored for the moment in units 21–25, inclusive.

When the operator types a second letter, the automatic-telegraph sender 50 applies an additional 5-digit message-pulse group to the shifting register 51 in a manner similar to that just explained in connection with the 5 message digits representing the first letter. Thereupon, the shifting register 51 transfers the 5 message digits representing the first letter from units 21–25, inclusive, to units 16–20, inclusive, respectively, and stores the 5 message digits representing the second letter in the units 21–25, inclusive. Thus, when the operator has typed 5 letters represented by 25 message digits, the 25 message digits will be stored in the order developed in storage units 1–25, inclusive, of the shifting register 51. The 25 storage units then simultaneously apply signals representing the stored message digits to the message-digit register 54. A high-positive-potential signal preferably represents a message-digit pulse, while a low-positive-potential signal or zero-potential signal preferably represents the message-digit space. At this time, when keyed by one of the synchronizing circuits 63–67, inclusive, the message-digit register 54 stores the 25 message digits applied thereto in 25 individual storage units. The message-digit register 54 then simultaneously applies signals representative of the 25 digits to segments 1*a*–25*a*, inclusive, of the scanner 55.

In response to the operation of the synchronizing circuits, the controlled driving mechanism 57 then once rotates the movable arm 58 of the scanner 55 which develops a 25-digit message-code pulse group representative of the 5 5-digit message-code pulse groups stored by the register 54 together with synchronizing pulses to be considered subsequently. The scanner 55 applies the synchronizing pulses and the 25-digit message-code pulse group to the radio-frequency transmitter 60 which develops a frequency-shift-modulated radio-frequency signal representative of the applied synchronizing pulses and message-code pulses for application to the antenna 61, 61. The antenna 61, 61, in turn, radiates the developed signal.

Considering now the operation of the synchronizing circuits 63–67, inclusive, as mentioned previously, upon the application of each start-synchronizing digit to the relay winding 62*a* that relay de-energizes, causing the contact 62*b* to close. The closing of the contact 62*b* triggers the triggered pulse generator 63 which, after a short time delay of the order of ½ digit, energizes the relay winding 52*a* during the interval of the output pulse developed thereby. The duration of the output pulse of the triggered pulse generator 63 and, consequently, of the period of energization of the relay winding 52*a*, is approximately equal to the time required for the development of 5 message digits by the automatic-telegraph sender 50.

When the relay winding 52*a* is energized, the relay contact 52*b* closes, connecting one output terminal of the automatic-telegraph sender 50 to the relay contact 53*b*, and the relay contact 52*c* closes, causing the alternate generation of shifting pulses and sampling pulses by the generator 64. The first shifting pulse developed is applied to the shifting register 51 to shift the digits stored by that register from each storage unit to the succeeding unit, thereby clearing the storage unit 25 for the application of a message digit thereto. While the first shifting pulse is generated, the generator 64 de-energizes the relay winding 53*a*, opening the relay contact 53*b* temporarily to maintain the unit 50 disconnected from the shifting register 51. The first shifting pulse is then followed by a sampling pulse which energizes the relay winding 53*a*, closing the contact 53*b* during a portion of the interval of the first message digit to connect the automatic-telegraph sender 50 to the shifting register 51 at that time. After 5 shifting pulses and 5 sampling pulses have been generated by the unit 64 in a similar manner, the relay contact 52*c* opens, causing the operation of the generator to cease. At the same time, the relay contact 52*b* opens disconnnecting the unit 50 from the relay contact 53*b* and the shifting register 51.

The generator 64 also applies the sampling pulses developed thereby to the sampling-pulse counter 65. When 25 sampling pulses have been counted by the counter 65, indicating that 25 message digits have been generated by the automatic-telegraph sender 50, the counter 65 applies a trigger pulse to the keying-pulse generators 66 and the reset-pulse generator 67. The keying-pulse generators, at suitable delay times, trigger the message-digit register 54 and the controlled driving mechanism 57. When the message-digit register 54 has performed its previously described function, after the development of each plurality of 25 message digits, the reset-pulse generator 67 applies a reset pulse thereto at a suitable delay time to reset the various storage units of the register 54 to reference operating conditions and thereby condition the units for operation upon the development of the next plurality of 25 message digits.

*Description of synchronizing-signal generator of Fig. 1 system*

The Fig. 1 pulse-code-transmitting system also includes a synchronizing-signal generator coupled to the digit-scanning means 55 for generating a synchronizing-pulse group for transmission with the derived group of message-code digits derived by the digit-scanning means. More particularly, the synchronizing-signal generator comprises, for example, the arm 58 and the segments 56 of the scanner 55 for generating a two-part synchronizing signal. To this end, as previously mentioned, the segments 56 are alternately connected to the positive and negative terminals of the source of potential +B′. The segments 56 are individually so proportioned in length, as indicated in the drawings, that the two parts of the synchronizing signal individually comprise pulse groups distinguishable from each other and from the derived message-code group.

More particularly, the synchronizing-signal generator includes first signal-generating means for generating the first part of a two-part synchronizing signal comprising a first pulse group preferably of alternate pulse-space formation including a 1½ digit pulse and 5 single-digit pulses and spaces. The first signal-generating means comprises, for example, segments 56*a*–56*c*, inclusive, 56*e*, and 56*f*, individually of single-digit length, and segment 56*d*, preferably of 1½ digit length for developing a 1½ digit pulse.

The synchronizing-signal generator also includes second signal-generating means for generating the second part of the synchronizing signal comprising a second pulse group preferably of alternate pulse-space formation including a 2½ digit space and 5 single-digit pulses and spaces. The second signal-generating means includes scanner segments, for example, 56*g*, 56*h*, and 56*j*–56*l*, inclusive, individually of single-digit length, and segment 56*i*, preferably of 2½ digit length for generating a 2½ digit space between pulses to cause the two parts of the generated synchronizing signal to be of nonintegral digital formation individually comprising 6½ digits and 7½ digits. Of course, any suitable electrical equivalent may be substituted for the portions of the scanner 55 to generate the two-part synchronizing signal.

The synchronizing-signal generator also includes actuating means coupled to the first and second signal-generating means for timing the operation thereof to effect the generation of the synchronizing signal prior to the transmission of the group of message-code digits. This actuating means comprises the controlled driving mechanism 57 and the previously mentioned synchronizing circuits 63–66, inclusive, associated therewith.

*Operation of synchronizing-signal generator of Fig. 1 system*

Returning now to a consideration of the generation of the two-part synchronizing signal by a portion of the scanner 55, the scanner develops the synchronizing signal once during each rotation of the scanner arm 58 as it sweeps clockwise by segments **56*a*–56*l*, inclusive. The normal rest position of the arm 58 between sweeps is at the segment 56*a***. Accordingly, the scanner develops the synchronizing signal immediately before scanning each group of 25 message-code digits.

As the arm 58 of the scanner 55 sweeps across the segments **56*a*–56*l*, inclusive, the potential picked off the segments by the scanner arm changes abruptly from that of the negative terminal of the source +B′ to the potential of the positive terminal thereof since the segments are alternately connected to the negative and positive terminals. Since all the segments of the scanner except the segments 56*d* and 56*i* are of the same single-digit length, the amplitude-time characteristic of the potential developed at the arm 58 may be represented as a series of alternate pulses and spaces of the same duration except for the pulse and space corresponding to the segments 56*d* and 56*i***, respectively, as shown by the graph of Fig. 1*a*. Accordingly, the signal comprises pulses B, D, F, H, J, and L, generated as the scanner arm sweeps by segments **56*b*, 56*d*, 56*f*, 56*h*, 56*j*, and 56*l*, and intervening spaces A, C, E, G, I, and K, generated as the scanner arm sweeps between segments 56*a*, 56*c*, 56*e*, 56*g*, 56*i*, and 56*k*, respectively. Pulses B, F, H, J, and L are of single-digit duration since the segments causing the generation of these pulses are of single-digit length. Pulse D, however, is of 1½ digit duration since the segment 56*d* corresponding thereto has a 1½ digit length. Each of the spaces except space I is of single-digit duration since the corresponding segments are of single-digit length. The space I, however, has 2½ digit duration since the segment 56*i*** corresponding thereto has a 2½ digit length.

The synchronizing signal may, therefore, be considered as comprising two parts so indicated on Fig. 1*a*. Part 1 is of 6½ digit duration including pulses B and F and the 1½ digit pulse D, while part 2 is of 7½ digit duration including the 2½ digit space I, as indicated on the graph.

The radio-frequency transmitter 60 develops radio-frequency synchronizing pulses in the manner previously explained in response to the synchronizing signal which is applied thereto as a modulating signal by the scanner 55. The amplitude-time characteristic of these radio-frequency synchronizing pulses, of course, is similar to that represented by the Fig. 1*a* graph.

*Description of Fig. 1b storage unit*

Referring now more particularly to Fig. 1*b* of the drawings, there is represented, in detail, a pulse-storage unit of the type which may be included in the message-digit register 54. The message-digit register 54 includes 25 such units having common keying-pulse input terminals and common reset-pulse input terminals but individual message-pulse input terminals.

The Fig. 1*b* pulse-storage unit comprises a normally nonconductive, gas-filled, multigrid thyratron tube 68. A keying-pulse input circuit adapted for connection to a keying-pulse generator of unit 66 of Fig. 1 and comprising a coupling condenser-grid leak resistor network 69 is connected to a first control electrode of the tube 68. A source of bias potential —C is included in the control electrode-cathode circuit of the tube 68 to maintain the tube normally nonconductive. A second control electrode 70 is adapted for connection to one of the pulse-storage units of the shifting register 51 of the Fig. 1 transmitting system. The anode-cathode circuit of the tube 68 includes a cathode load resistor 71 across which an output signal is developed and a relay contact **72*b* associated with a relay winding 72*a* connected to the reset-pulse generator 67**.

*Operation of Fig. 1b storage unit*

Considering now the operation of the Fig. 1*b* storage unit, the thyratron tube 68 thereof is normally nonconductive, as mentioned previously. To render the tube conductive, a relatively high positive potential representative of a stored pulse must be applied to the control electrode 70. At this time, a positive keying pulse is applied to the input circuit 69 of the tube. Under such operating conditions, the tube fires when the keying pulse is applied thereto, developing across the cathode load resistor 71 a relatively high positive potential which represents a pulse stored by the storage unit.

The storage unit is restored to its normally nonconductive condition by the application of a reset pulse to the relay winding **72*a*. At this time, the relay winding 72*a* is energized, opening the contact 72*b* and rendering the tube 68 nonconductive. In the event that a relatively low positive potential or a potential of zero value representing a space is applied to the control electrode 70, the keying pulse applied to the input circuit 69 is ineffective to render the tube 68 conductive. Accordingly, no positive potential is then developed across the cathode resistor 71**, indicating that the storage unit is storing a space rather than a pulse.

*Description of Fig. 2 pulse-code-receiving system*

Referring now more particularly to Fig. 2 of the drawings, there is represented a pulse-code-receiving system constructed in accordance with the invention. The pulse-code-receiving system comprises a code-pulse circuit for receiving the transmitted signal representing synchronizing-pulse groups as well as message-code pulses representative of discrete message symbols. The code-pulse circuit preferably comprises a receiver antenna 73, 73 and a radio-frequency receiver 74 of the frequency-shift modulation type and of conventional construction coupled thereto.

The receiving system also preferably includes first pulse-storage means coupled to the receiving circuit for storing the synchronizing-pulse groups and means responsive to the stored synchronizing-pulse groups for developing a timing-control signal. The first pulse-storage means and the responsive means just mentioned are included in a synchronizing-signal recognizer 84 having a pair of input terminals 152, 152 coupled through a relay contact **76*b* to the radio-frequency receiver 74. The synchronizing-signal recognizer 84** will subsequently be described in detail.

The receiving system also includes second pulse-storage means effectively responsive to the above-mentioned timing-control signal and coupled to the receiving circuit 74 for storing a predetermined plurality of plural-digit message-code pulse groups individually representative of the message symbols. More particularly, the second pulse-storage means comprises, for example, a shifting register 75 which may be generally similar in construction to the shifting register 51 of the Fig. 1 transmitting system and includes, for example, 25 pulse-triggered storage units for storing 5 5-digit message-code pulse groups. The radio-frequency receiver 74 is coupled to the input circuit of the shifting register 75 through the relay contact **76*b* and a normally closed relay contact 77*b*** in a manner more fully described hereinafter.

The 25 storage units of the shifting register 75 are individually connected to 25 storage units of a message-digit register 78 which may be of similar construction to the message-digit register 54 of the Fig. 1 transmitting system for storing, for example, 5-digit message-code pulse groups individually representing 5 message symbols.

The pulse-code-receiving system also includes pulse-decoding means responsive to the message-code pulse groups for reproducing the message symbols. The pulse-decoding means preferably comprises a pulse-triggered message-digit scanner 79, represented for simplicity of explanation as a mechanical scanner. The message-digit scanner 79 is coupled to the pulse-storage units of the message-digit register 78 for sequentially deriving therefrom the message-code pulse groups in a predetermined order and for generating start-stop synchronizing digits for each such group. The scanner comprises several segments of single-digit length shown in part in the drawings. The segments connected to the pulse-storage units of the message-digit register 78 are numbered **1*b*–25*b*, inclusive, and are separated, in groups of 5, by segments designated stop and start and connected to the positive and negative terminals of a source +B′, respectively, as indicated in the drawings. The scanner also includes a movable arm 80 connected to a controlled driving mechanism 81 of conventional construction, as indicated by a broken line 82**.

The pulse-decoding means preferably also includes an automatic-teleraph printer 83 responsive to the message-code pulse groups and to the start-stop synchronizing digits for sequentially reproducing the discrete message symbols. The automatic-telegraph printer may be of conventional construction, for example, of the type described in pages 18–27 to 18–29, inclusive, of the above-mentioned "Electrical Engineers' Handbook."

There are also provided trigger-pulse generators 85 generally similar in construction to the synchronizing circuits of the Fig. 1 transmitting system comprising the relay winding **62*a*, relay contact 62*b*, triggered pulse generator 63, relay winding 52*a*, relay contact 52*c*, sampling-pulse and shifting-pulse generator 64, sampling-pulse counter 65, keying-pulse generators 66 and reset-pulse generator 67. The trigger-pulse generators 85 are coupled to output terminals 153, 153 of the synchronizing-signal recognizer 84 for generating pulses which trigger the pulse-storage means comprising the shifting register 75 in synchronism with the supply of individual digits of the received message-code pulse groups and for triggering the pulse-decoding means comprising the scanner 79 in synchronism with the supply of each 25-digit group of message-code pulses. A relay winding 76*a* associated with the contact 76*b* and a relay winding 77*a* associated with the contact 77*b* are also connected to the trigger-pulse generators 85 for operation in synchronism with the supply of each 25-digit group of message-code pulses. Connections are also provided from the reset-pulse generator of the unit 85 to the message-digit register 78 for resetting the storage units of the register 78** to their reference operating conditions at the proper times.

*Operation of Fig. 2 pulse-code-receiving system*

Considering now the operation of the Fig. 2 pulse-code-receiving system, the radio-frequency receiver 74 derives the modulation components of the radio-frequency signal representing synchronizing pulses and message-code pulses and transmitted by the Fig. 1 pulse-code-transmitting system and intercepted by the antenna 73, 73 of the Fig. 2 receiving system. The pulses derived from the received signal are applied to the synchronizing-signal recognizer 84 which triggers the trigger-pulse generators 85 in a manner more fully explained subsequently. One of the trigger-pulse generators then applies to the relay winding **76*a*** a pulse which energizes the relay winding during the entire period of reception of the message-code pulses.

While the relay winding **76*a* is energized closing the contact 76*b*, the radio-frequency receiver 74 is coupled to the shifting register 75 for applying the received message-code pulses thereto during sampling intervals when the relay contact 77*b* is closed, as determined by the operation of the trigger-pulse generators 85. The shifting register 75 operates in a manner similar to the shifting register 51 of the Fig. 1 transmitting system for storing the 25 message-code digits representing 5 message symbols. To this end, the trigger-pulse generators 85 apply a group of 25 shifting pulses to the shifting register 75 individually followed in time by 25 sampling pulses which are applied to the relay winding 77*a*. Each of the storage units of the register 75** has one operating condition representing a stored pulse and another operating condition representing the absence of a stored pulse.

When the 25 message-code digits of a received signal group have been stored by the shifting register 75 the 25 storage units of the shifting register then simultaneously apply signals representing the stored digits to the message-digit register 78. At this time, when keyed by one of the trigger-pulse generators 85, the message-digit register 78 stores the 25 digits applied thereto in 25 individual storage units. The message-digit register 78 then applies signals representing the 25 stored digits individually to the 25 segments **1*b*–25*b*, inclusive, of the message-digit scanner 79**.

When triggered by one of the trigger-pulse generators 85, the controlled driving mechanism 81 once rotates the movable arm of the message-digit scanner 79 which develops in succession 5-digit message-code pulse groups individually preceded by a start-synchronizing digit and followed by a stop-synchronizing digit and corresponding to the pulse groups generated by the automatic-telegraph sender 50 of the Fig. 1 transmitting system. The start-synchronizing and stop-synchronizing digits just mentioned are generated by the scanner 79 as the movable arm 80 thereof sweeps by the start and stop segments of the scanner immediately preceding and following each group of 5 message-digit segments. The normal rest position of the scanner arm 80 between sweeps is at a stop segment, as shown in the drawings.

The automatic-telegraph printer 83 responds to the signal applied thereto by the scanner 79 in a well-known manner to reproduce the discrete message symbols typed by the operator of the automatic-telegraph sender 50 of the Fig. 1 transmitting system.

*Description of Fig. 3 synchronizing-signal recognizer*

Referring now more particularly to Fig. 3 of the drawings, there is represented in detail the synchronizing-signal recognizer 84 of the Fig. 2 receiving system. As mentioned previously, the synchronizing-signal recognizer 84 preferably comprises first pulse-storage means coupled to the receiver 74 of the Fig. 2 receiving system for storing the synchronizing-pulse groups applied thereto by the receiver. More particularly, the first pulse-storage means just mentioned comprises, for example, tape-recording means 90 of a conventional type including a recording head 91 coupled to the receiver 74 of the Fig. 2 system and a magnetic tape roll 92 mounted on rotatable drive and guide wheels 93, 94, respectively, driven by a motor 95. The tape-recording means 90 also includes a conventional obliterating oscillator 150 and obliterating head 151.

There preferably is also provided a pair of means individually responsive to the stored synchronizing-pulse groups for individually deriving control signals therefrom. This pair of means comprises, for example, a first group of pickup heads 96–101, inclusive, responsive to the leading and trailing pulse edges of one of the stored synchronizing-pulse groups and a first group of normally conductive, unidirectionally conductive devices 102–107, inclusive, coupled to the pickup heads 96–101, inclusive, respectively, and having a common terminal 108 for deriving a first control pulse from the aforesaid one synchronizing-pulse group. The pickup heads 96–101, inclusive, may be of conventional construction for deriving a differentiated pulse from each leading and trailing pulse edge, such as, for example, described in an article entitled "Frequency-Modulated Magnetic-Tape Transient Recorder," by Harry B. Shaper, published in the November 1945 "Proceedings of the I.R.E." The devices 102–107, inclusive, preferably comprise normally conductive contact diodes.

The pair of synchronizing-pulse-responsive means also comprises, for example, a second group of pickup heads 101 and 109–113, inclusive, of similar construction to the first group of such heads 96–101, inclusive, and responsive to the leading and trailing pulse edges of the other of the stored synchronizing-pulse groups. The responsive means also preferably includes a second group of normally conductive, unidirectionally conductive devices 114–119, inclusive, similar to the first group of such devices 102–107, inclusive, coupled to the pickup heads 101 and 109–113, inclusive, respectively, and having a common terminal 120 for deriving a second control pulse from the aforesaid other synchronizing-pulse group.

There preferably are coupled between the pickup heads 96–101, inclusive, and 109–113, inclusive, and the diodes 102–107, inclusive, and 114–119, inclusive, respectively, several triggered pulse generators 121–131, inclusive, individually responsive to output pulses supplied by the pickup heads for developing positive-potential pulses of slightly longer duration. Each of the generators may, for example, comprise a triggered one-pulse multivibrator of the type described at pages 9–18 of the above-mentioned "Electrical Engineers' Handbook."

The synchronizing-signal recognizer preferably also includes means responsive to predetermined pulses of the stored synchronizing-pulse groups for deriving a third control signal therefrom. More particularly, this means comprises, for example, the pickup heads 98, 99, and 110–113, inclusive, and normally conductive, unidirectionally conductive devices 132–137, inclusive, individually coupled thereto and having a common terminal 138.

The terminals 108, 120, and 138 preferably are coupled to a control circuit, responsive to any of the above-mentioned control signals in the absence of the others due to degradation of one or more of the synchronizing-pulse groups, for effectively utilizing the same as a timing-control signal for triggering the second pulse-storage means comprising the shifting register 75 of the Fig. 2 system and the pulse-decoding means comprising the scanner 79 and the automatic-telegraph printer 83 of the Fig. 2 system. The control circuit preferably includes voltage-dropping resistors 139–141, inclusive, individually coupled to a suitable source of positive potential +B″ and to normally nonconductive contact diodes 142, 143, and 144, respectively. These diodes are individually connected to one terminal of a normally de-energized relay winding 145*a* having its other terminal connected to a source of positive potential +B‴ for maintaining the diodes 142–144, inclusive, nonconductive. A normally open relay contact 145*b* is associated with the relay winding 145*a*. The relay contact 145*b* is coupled to the input circuit of one of the trigger-pulse generators 85 of the Fig. 2 receiving system.

*Operation of Fig. 3 synchronizing-signal recognizer*

Considering now the operation of the synchronizing-signal recognizer 84 of the Fig. 2 receiving system, the radio-frequency receiver 74 applies the modulation components of a received synchronizing signal through the relay contact 76*b* to the terminals 152, 152 of the synchronizing-signal recognizer 84. More particularly, as represented in Fig. 3, the receiver applies the synchronizing signal to the recording head 91 of the tape-recording means 90. The recording head 91 records the synchronizing signal on the magnetic tape 92 as magnetization variations while the tape passes under the recording head in a conventional manner. When the 12 pulses and spaces of the 14-digit synchronizing signal have been recorded on the tape 92, in the absence of noise degradation of the received synchronizing signal, the tape has a magnetization-distribution characteristic as indicated by the graph of Fig. 3.

The magnetization-distribution characteristic represented by the Fig. 3 graph corresponds to the modulation components of the received radio-frequency synchronizing signal. The leading and trailing edges of the magnetization pulses of the tape 92 simultaneously pass under individual ones of the pickup heads 96–101, inclusive, and 109–113, inclusive, as indicated in Fig. 3. The pickup heads effectively transform by differentiation in a usual manner the leading and trailing edges of the synchronizing pulses represented by the magnetization pulses to positive-potential pulses of short duration and occurring substantially simultaneously. To this end, the alternate pickup heads 96, 98, 100, 109, 111, and 113, and the intervening pickup heads 97, 99, 101, 110, and 112 are connected with opposite polarities to the generators 121–131, inclusive, so that the above-mentioned alternate pickup heads develop positive-potential pulses in response to leading synchronizing-pulse edges, while the above-mentioned intervening pickup heads develop positive-potential pulses in response to trailing synchronizing-pulse edges. These positive-potential pulses are simultaneously applied to the triggered pulse generators 121–131, inclusive, which individually develop positive-potential pulses of slightly longer duration for tolerance purposes to ensure simultaneity of at least portions thereof notwithstanding any small differences which may ocur in the timing of the pulses derived by the pickup heads.

The output pulses of the triggered pulse generators 121–131, inclusive, simultaneously render nonconductive the normally conductive diodes 102–107, inclusive, 114–119, inclusive, and 132–137, inclusive. When all of the diodes of any one of the groups just mentioned are nonconductive, the potential at the corresponding one of the junctions 108, 120, and 138 rises sufficiently to render conductive the corresponding one of the diodes 142–144, inclusive. Accordingly, because all the diodes 102–107, inclusive, 114–119, inclusive, and 132–137, inclusive, are rendered nonconductive under the described operating conditions, the potential at each of the junctions 108, 120, and 138 rises, rendering conductive the normally nonconductive diodes 142, 143, and 144. The current flow through any of the three diodes 142–144, inclusive, is sufficient to energize the normally de-energized relay winding 145*a*, thereby closing the normally open relay contact 145*b* to trigger the trigger-pulse generators 85 of the Fig. 2 receiving system and cause the application of the following 25 message-code digits to the shifting register 75 of the Fig. 2 receiving system in the manner explained previously.

As the magnetic tape 92 passes under the obliterating head 151, the signal thereon is obliterated in a conventional manner to ready the tape for subsequent use.

In the event that noise degradation of the synchronizing signal during the transmission thereof from the Fig. 1 transmitting system to the Fig. 2 receiving system causes the distortion or effective loss of one synchronizing digit of the 14-digit group by, for example, changing the digit from a pulse to a space, or vice versa, one part of the synchronizing signal will then be ineffective to cause synchronization. For example, assume that noise changes pulse B from a pulse to a space, the pickup devices 96 and 97 then are ineffective to supply positive-potential pulses to the triggered pulse generators 121 and 122 at the time that the other pickup heads supply such pulses to their corresponding generators. Accordingly, diodes 102 and 103 remain conductive, while the other diodes 104–107, inclusive, 114–119, inclusive, and 132–137, inclusive, are rendered nonconductive. In order for the potential at the junction 108 to rise sufficiently to render conductive the diode 142, all of the diodes 102–107, inclusive, most conduct. The diode 142, therefore, remains nonconductive. The potentials at junctions 120 and 138, however, rise sufficiently to render conductive the diodes 143 and 144 and cause energization of the relay winding 145*a*, thereby effecting synchronization.

Assume now that noise changes pulse F from a pulse to a space, thereby introducing error into both parts of the synchronizing signal, the pickup devices 100 and 101 then are ineffective to trigger the generators 125 and 126 at the proper time. The diodes 106, 107, and 114 remain conductive and the potentials at each of the junctions 108 and 120 do not rise sufficiently to render conductive the diodes 142 and 143. The combination of pickup devices 98, 99, and 110–113, inclusive, however, is rendered nonconductive in its entirety, causing the potential at junction 138 to rise sufficiently to render conductive the diode 144 and energize the relay winding 145*a* to effect synchronization.

From the foregoing examples it will be seen that no loss of synchronization occurs notwithstanding one error in any of the synchronizing-pulse groups or several errors in the same synchronizing-pulse group. Since the synchronizing-pulse groups are distinguishable from each other, the pickup heads 96–101, inclusive, of the first group are simultaneously responsive only to the first part of the synchronizing signal, and the pickup heads 101 and 109–113, inclusive, of the second group are simultaneously responsive only to the second part of the synchronizing signal. Similarly, pickup heads 98, 99, and 110–113, inclusive, of the combination group are simultaneously responsive only to a predetermined combination of portions of the first and second synchronizing-signal parts. Further, since each of the synchronizing-pulse groups includes a nonintegral digit, for example, digits D and I of 1½ digit and 2½ digit duration, respectively, noise which alters ½ to 1 digit of the succeeding message-code pulse group will ordinarily be ineffective to cause the message-coke pulse group to assume the same pulse formation as either part of the synchronizing signal. Also, noise ordinarily is ineffective to alter one part of the synchronizing signal in such manner as to cause that part to assume the same pulse formation as the other part. Thus, the likelihood of loss of synchronization or improper synchronization is small.

From the foregoing description it will be apparent that a pulse-code-communication system constructed in accordance with the invention has, in addition to the advantages just mentioned, the advantage that it is capable of operating in conjunction with conventional automatic-telegraph sending and printing equipment. The system is also readily adaptable for use in connection with a self-correcting pulse-code-communication system of the type described and claimed in the copending application of Richard C. Curtis, filed concurrently herewith, and entitled "Self-Correcting Pulse-Code-Communication System" now Pat. No. 2,862,054 granted Nov. 25, 1958.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pulse-code-communication system for translating message-code pulses representative of discrete message symbols and for reproducing said symbols comprising: a pulse-code-transmitting system comprising a pulse coder for developing plural-digit message-code pulse groups individually representative of said symbols, pulse-storage means responsive to said pulse coder for storing message-code digits in a predetermined plurality of said groups, digit-scanning means responsive to said pulse-storage means for sequentially deriving therefrom said message-code digits of said stored groups for transmission as a single group and in a predetermined digital order, and a synchronizing-signal generator coupled to said scanning means for generating a two-part synchronizing signal for transmission with said derived group of message-code digits, and having parts individually comprising pulse groups of nonintegral digital formation and distinguishable from each other and from said derived group; and a pulse-code-receiving system comprising a code-pulse circuit for receiving a signal representing said derived group of message-code digits and said two-part synchronizing signal subject to noise degradation during transmission, first pulse-storage means coupled to said receiving circuit for storing said synchronizing-pulse groups, means responsive to either of said stored synchronizing-pulse groups upon degradation of the other for developing a timing-control signal, second pulse-storage means responsive to said timing-control signal and coupled to said receiving circuit for storing said predetermined plurality of message-code pulse groups, and pulse-decoding means responsive to said message-code pulse groups for reproducing said symbols.

2. A pulse-code-communication system for translating code-message pulses representative of discrete message symbols and for reproducing said symbols comprising: a pulse-code-transmitting system comprising an automatic-telegraph pulse coder for developing 5-digit binary-permutation-code message pulse groups individually representative of said symbols, pulse-storage means responsive to said pulse coder for storing 25 code-message digits in 5 of said groups, digit-scanning means responsive to said pulse-storage means for sequentially deriving therefrom said 25 code-message digits of said stored groups for transmission as a single group and in a predetermined digital order, and a synchronizing-signal generator coupled to said scanning means for generating a two-part 14-digit synchronizing signal for transmission with said derived group of message-code digits and having parts individually comprising 6½ digit and 7½ digit pulse groups distinguishable from each other and from said derived group; and a pulse-code-receiving system comprising a code-pulse circuit for receiving a signal representing said derived group of message-code digits and said two-part synchronizing signal subject to noise degradation during transmission, first pulse-storage means coupled to said receiving circuit for storing said synchronizing-pulse groups, means responsive to either of said stored synchronizing-pulse groups upon degradation of the other for developing a timing-control signal, second pulse-storage means responsive to said timing-control signal and coupled to said receiving circuit for storing said 5 message-code pulse groups, and pulse-decoding means responsive to said message-code pulse groups for reproducing said symbols.

3. A pulse-code-transmitting system for transmitting message-code pulses representative of discrete message symbols comprising: a pulse coder for developing plural-digit message-code pulse groups individually representative of said symbols; pulse-storage means responsive to said pulse coder for storing message-code digits in a predetermined plurality of said groups; digit-scanning means responsive to said pulse-storage means for sequentially deriving therefrom all said message-code digits of said stored groups for transmission as a signal collective group and in a predetermined digital order; and synchronizing-signal generating means coupled to said scanning means for generating the same synchronizing-pulse group for transmission with each transmitter collective group of message-code digits.

4. A pulse-code-transmitting system for transmitting binary-permutation-code message pulses representative of discrete message symbols comprising: a pulse coder for developing plural-digit binary-permutation-code message pulse groups individually representative of said symbols; pulse-storage means responsive to said pulse coder for storing message digits in a predetermined plurality of said groups; digit-scanning means responsive to said pulse-storage means for sequentially deriving therefrom all said message digits of said stored groups for transmission as a single collective group and in a predetermined digital order; and synchronizing-signal generating means coupled to said scanning means for generating the same synchronizing-pulse group for transmission with each transmitted collective group of message digits.

5. A pulse-code-transmitting system for transmitting message-code pulses representative of discrete message symbols comprising: a manually actuated automatic-telegraph pulse coder for sequentially developing plural-digit message-code pulse groups individually representative of said symbols; pulse-storage means responsive to said pulse coder for storing message-code digits in a predetermined plurality of said groups: digit-scanning means responsive to said pulse-storage means for sequentially deriving therefrom all said message-code digits of said stored groups for transmission as a single collective group and in a predetermined digital order; and synchronizing-signal generating means coupled to said scanning means for generating the same synchronizing-pulse group for transmission with each transmitted collective group of message-code digits.

6. A pulse-code-transmitting system for transmitting message-code pulses representative of discrete message symbols comprising: a pulse coder for developing 5-digit message-code pulse groups individually representative of said symbols; pulse-storage means responsive to said pulse coder for storing 25 message-code digits in 5 of said groups; digit-scanning means responsive to said pulse-storage means for sequentially deriving therefrom all said 25 message-code digits of said stored groups for transmission as a single collective group and in a predetermined digital order; and synchronizing-signal generating means coupled to said scanning means for generating the same synchronizing-pulse group for transmission with each transmitted collective group of message-code digits.

7. A pulse-code-transmitting system for transmitting message-code pulses representative of discrete message symbols comprising: a pulse coder for developing plural-digit message-code electrical pulse groups individually represenative of said symbols; pulse-storage means comprising circuit units coupled to said pulse coder for individually storing message-code digits in a predetermined plurality of said groups, each of said circuit units having one operating condition representing a stored pulse and another operating condition representing the absence of a stored pulse; digit-scanning means responsive to said pulse-storage means for sequentially deriving therefrom all said message-code digits of said stored groups for transmission as a single collective group and in a predetermined digital order; and synchronizing-signal generating means generator coupled to said scanning means for generating the same synchronizing-pulse group for transmission with each transmitted collective group of message-code digits.

8. A pulse-code-transmitting system for transmitting message-code pulses representative of discrete message symbols comprising: a pulse coder for developing plural-digit message-code pulse groups individually representative of said symbols; pulse-storage means responsive to said pulse coder for storing message-code digits in a predetermined plurality of said groups; digit-scanning means responsive to said pulse-storage means for sequentially deriving therefrom all said stored groups of message-code digits for transmission as a single collective group and in a predetermined digital order; and synchronizing-signal generating means coupled to said scanning means for generating the same two-part synchronizing signal for transmission with each transmitted collective group of message-code digits, said parts individually comprising pulse groups distinguishable from each other and from said derived group.

9. A pulse-code-transmitting system for transmitting message-code pulses representative of discrete message symbols comprising: a pulse coder for developing plural-digit message-code pulse groups individually representative of said symbols; pulse-storage means responsive to said pulse coder for storing message-code digits in a predetermined plurality of said groups; digit-scanning means responsive to said pulse-storage means for sequentially deriving therefrom said stored groups of message-code digits for transmission as a single group and in a predetermined digital order; and synchronizing-signal generating means coupled to said scanning means for generating a two-part synchronizing signal for transmission with said derived group of message-code digits and having parts individually comprising pulse groups of different nonintegral digital formation distinguishable from each other and from said derived group.

10. A pulse-code-transmitting system for transmitting message-code pulses representative of discrete message symbols comprising: a pulse coder for developing plural-digit message-code pulse groups individually representative of said symbols; pulse-storage means responsive to said pulse coder for storing message-code digits in a predetermined plurality of said groups; digit-scanning means responsive to said pulse-storage means for sequentially deriving therefrom said stored groups of message-code digits for transmission as a single group and in a predetermined digital order; and a synchronizing-signal generator coupled to said scanning means for generating a 14-digit two-part synchronizing signal for transmission with said derived group of message-code digits, said parts individually comprising 6½ digit and 7½ digit pulse groups distinguishable from each other and from said derived group.

11. A pulse-code-transmitting system for transmitting message-code pulses representative of discrete message symbols comprising: a pulse coder for developing plural-digit message-code pulse groups individually representative of said symbols; pulse-storage means responsive to said pulse coder for storing message-code digits in a predetermined plurality of said groups; digit-scanning means responsive to said pulse-storage means for sequentially deriving therefrom said stored groups of message-code digits for transmission as a single group and in a predetermined digital order; and a synchronizing-signal generator coupled to said scanning means for generating a two-part synchronizing signal for transmission with said derived group of message-code digits, said parts individually comprising pulse groups individually including a 1½ digit pulse and a 2½ digit space between pulses and distinguishable from each other and from said derived group.

12. In a pulse-code-transmitting system for transmitting a group of message-code digits representative of discrete message symbols, a synchronizing-signal generator comprising: first signal-generating means for generating the first part of a two-part synchronizing signal comprising a first pulse group of nonintegral digital formation and distinguishable from said group of message-code digits; second signal-generating means for generating the second part of said synchronizing signal comprising a second pulse group of nonintegral digital formation and distinguishable from said first pulse group and from said group of message-code digits; and actuating means coupled to said first and second signal-generating means for timing the operation thereof to effect the generation of said synchronizing signal prior to the transmission of said group of message-code digits.

13. In a pulse-code-transmitting system for transmitting a group of message-code digits representative of discrete message symbols, a synchronizing-signal generator comprising: first signal-generating means for generating the first part of a two-part synchronizing signal comprising a 6½ digit first pulse group of alternate pulse-space formation including a 1½ digit pulse and 5 single-digit pulses and spaces and distinguishable from said group of message-code digits; second signal-generating means for generating the second part of said synchronizing signal comprising a 7½ digit second pulse group of alternate pulse-space formation including a 2½ digit space and 5 single- digit pulses and spaces and distinguishable from said first pulse group and from said group of message-code digits; and actuating means coupled to said first and second-generating means for timing the operation thereof to effect the generation of said synchronizing signal prior to the transmission of said group of message-code digits.

14. A pulse-code-receiving system for receiving a transmitted signal representing a synchronizing-pulse group and message-code pulses representative of discrete message symbols comprising: a code-pulse circuit for receiving said transmitted signal; first pulse-storage means coupled to said receiving circuit for storing said synchronizing-pulse group; means responsive to said stored synchronizing-pulse group for developing a timing-control signal; second pulse-storage means effectively responsive to said timing-control signal and coupled to said receiving circuit for storing a predetermined plurality of plural-digit message-code pulse groups individually representative of said symbols; and pulse-decoding means responsive to said message-code pulse groups for reproducing said symbols.

15. A pulse-code-receiving system for receiving a transmitted signal representing a synchronizing-pulse group and binary-permutation-code message pulses representative of discrete message symbols comprising: a code-pulse circuit for receiving said transmitted signal; first pulse-storage means coupled to said receiving circuit for storing said synchronizing-pulse group; means responsive to said stored synchronizing-pulse group for developing a timing-control signal; second pulse-storage means effectively responsive to said timing-control signal and coupled to said receiving circuit for storing 5 5-digit binary-permutation-code message pulse groups individually representative of said symbols; and pulse-decoding means responsive to said code-message pulse groups for reproducting said symbols.

16. A pulse-code-receiving system for receiving a transmitted signal representing a synchronizing-pulse group and message-code pulses representative of discrete message symbols comprising: a code-pulse circuit for receiving said transmitted signal; tape-recording means coupled to said receiving circuit for storing said synchronizing-pulse group; means responsive to said stored synchronizing-pulse group for developing a timing-control signal; pulse-storage circuit units effectively responsive to said timing-control signal and coupled to said receiving circuit for storing a predetermined plurality of plural-digit message-code pulse groups individually representative of said symbols, each of said circuit units having one operating condition representing a stored pulse and another operating condition representing the absence of a stored pulse; and pulse-decoding means responsive to said message-code pulse groups for reproducing said symbols.

17. A pulse-code-receiving system for receiving a transmitted signal representing message-code pulses representative of discrete message symbols and a two-part synchronizing signal, said parts individually comprising pulse groups distinguishable from each other and from said message-code pulses, and subject to noise degradation during transmission comprising: a code-pulse circuit for receiving said transmitted signal; first pulse-storage means coupled to said receiving circuit for storing said synchronizing-pulse groups; means responsive to either of said stored synchronizing-pulse groups upon degradation of the other for developing a timing-control signal; second pulse-storage means effectively responsive to said timing-control signal and coupled to said receiving circuit for storing a predetermined plurality of plural-digit message-code pulse groups individually representative of said symbols; and pulse-decoding means responsive to said message-code pulse groups for reproducing said symbols.

18. A pulse-code-receiving system for receiving a transmitted signal representing message-code pulses representative of discrete message symbols and a two-part synchronizing signal, said parts individually comprising pulse groups distinguishable from each other and from said message-code pulses, and subject to noise degradation during transmission comprising: a code-pulse circuit for receiving said transmitted signal; first pulse-storage means coupled to said receiving circuit for storing said synchronizing-pulse groups; a pair of means individually responsive to said stored synchronizing-pulse groups for individually deriving control signals therefrom; a control circuit responsive to either of said control signals in the absence of the other due to degradation of one of said synchronizing-pulse groups for effectively utilizing the same as a timing-control signal; second pulse-storage means effectively responsive to said timing-control signal and coupled to said receiving circuit for storing a predetermined plurality of plural-digit message-code pulse groups individually representative of said symbols; and pulse-decoding means responsive to said message-code pulse groups for reproducing said symbols.

19. A pulse-code-receiving system for receiving a transmitted signal representing message-code pulses representative of discrete message symbols and a two-part synchronizing signal, said parts individually comprising pulse groups distinguishable from each other and from said message-code pulses, and subject to noise degradation during transmission comprising: a code-pulse circuit for receiving said transmitted signal; first pulse-storage means coupled to said receiving circuit for storing said synchronizing-pulse groups; means comprising a first group of pickup devices responsive to the leading and trailing pulse edges of one of said stored synchronizing-pulse groups for deriving a first control signal; means comprising a second group of pickup devices responsive to the leading and trailing pulse edges of the other of said stored synchronizing-pulse groups for deriving a second control signal; a control circuit responsive to either of said control signals in the absence of the other due to degradation of one of said synchronizing-pulse groups for effectively utilizing the same as a timing-control signal; second pulse-storage means effectively responsive to said timing-control signal and coupled to said receiving circuit for storing a predetermined plurality of plural-digit message-code pulse groups individually representative of said symbols; and pulse-decoding means responsive to said message-code pulse groups for reproducing said symbols.

20. A pulse-code-receiving system for receiving a transmitted signal representing message-code pulses representative of discrete message symbols and a two-part synchronizing signal, said parts individually comprising pulse groups distinguishable from each other and from said message-code pulses, and subject to noise degradation during transmission comprising: a code-pulse circuit for receiving said transmitted signal; first pulse-storage means coupled to said receiving circuit for storing said synchronizing-pulse groups; a first group of pickup devices responsive to the leading and trailing pulse edges of one of said stored synchronizing-pulse groups and a first group of unidirectionally conductive devices individually coupled to said pickup devices and having a common terminal for deriving a control pulse from said one synchronizing-pulse group; a second group of pickup devices responsive to the leading and trailing pulse edges of the other of said stored synchronizing-pulse groups and a second group of unidirectionally conductive devices individually coupled to said pickup devices of said second group and having a common terminal for deriving a control pulse from said other synchronizing-pulse group; a control circuit coupled to said common terminal and responsive to either of said control pulses in the absence of the other due to degradation of one of said synchronizing-pulse groups for effectively utilizing the same as a timing-control pulse; second pulse-storage means effectively responsive to said timing-control pulse and coupled to said receiving circuit for storing a predetedmined plurality of plural-digit message-code pulse groups individually representative of said symbols; and pulse-decoding means responsive to said message-code pulse groups for reproducing said symbols.

21. A pulse-code-receiving system for receiving a transmitted signal representing message-code pulses representative of discrete message symbols and a two-part synchronizing signal, said parts individually comprising pulse groups distinguishable from each other and from said message-code pulses, and subject to noise degradation during transmission comprising: a code-pulse circuit for receiving said transmitted signal; first pulse-storage means coupled to said receiving circuit for storing said synchronizing-pulse groups; a pair of means individually responsive to said stored synchronizing-pulse groups for individually deriving control signals therefrom; means responsive to predetermined pulses of said stored synchronizing-pulse groups for deriving a third control signal therefrom; a control circuit responsive to any of said control signals in the absence of the others due to degradation of one or more of said synchronizing-pulse groups for effectively utilizing the same as a timing-control signal; second pulse-storage means effectively responsive to said timing-control signal and coupled to said receiving circuit for storing a predetermined plurality of plural-digit message-code pulse groups individually representative of said symbols; and pulse-decoding means responsive to said message-code pulse groups for reproducing said symbols.

22. A pulse-code-receiving system for receiving a transmitted signal representing a synchronizing-pulse group and message-code pulses representative of discrete message symbols comprising: a code-pulse circuit for receiving said transmitted signal; first pulse-storage means coupled to said receiving circuit for storing said synchronizing-pulse group; means responsive to said stored synchronizing-pulse group for developing a timing-control signal; second pulse-storage means effectively responsive to said timing-control signal and coupled to said receiving circuit for storing a predetermined plurality of plural-digit message-code pulse groups individually representative of said symbols; and automatic-telegraph pulse-decoding means comprising a message-digit scanner coupled to said second pulse-storage means for sequentially deriving therefrom said message-code pulse groups in a predetermined order and for generating and utilizing start-stop synchronizing digits for each such group for sequentially reproducing said symbols.

23. In a pulse-code-receiving system for receiving a transmitted signal representing message-code pulses representative of discrete message symbols and a two-part synchronizing signal, said parts individually comprising pulse groups distinguishable from each other and from said message-code pulses, and subject to noise degradation during transmission, a synchronizing-signal recognizer comprising: terminals for supplying said transmitted signal; first pulse-storage means coupled to said terminals for storing said synchronizing pulse groups; means responsive to either of said stored synchronizing-pulse groups upon degradation of the other for developing a timing-control signal; second pulse-storage means responsive to said timing-control signal and coupled to said terminals for storing a predetermined plurality of plural-digit message-code pulse groups individually representative of said symbols; and pulse-decoding means responsive to said message-code pulse groups for reproducing said symbols.

References Cited in the file of this patent

UNITED STATES PATENTS

| | | |
|---|---|---|
| 1,332,976 | Dowd | Mar. 9, 1920 |
| 1,501,683 | Oswald | July 25, 1924 |
| 1,689,294 | Potts | Oct. 28, 1928 |
| 1,810,107 | Kleinschmidt | June 16, 1931 |
| 1,864,074 | Krum | June 21, 1932 |
| 1,939,396 | Kerr | Dec. 12, 1933 |
| 2,068,711 | Robinson | Jan. 26, 1937 |
| 2,187,892 | Quinby | Jan. 23, 1940 |
| 2,351,014 | Connery et al. | June 13, 1944 |
| 2,375,383 | Potts | May 8, 1945 |
| 2,411,441 | Leroy et al. | Nov. 19, 1946 |
| 2,440,118 | Reinhold | Apr. 20, 1948 |
| 2,442,301 | Locke | May 25, 1948 |
| 2,456,825 | Fitch et al. | Dec. 21, 1948 |
| 2,457,974 | Bliss | Jan. 4, 1949 |
| 2,504,997 | Mason | Apr. 25, 1950 |
| 2,649,502 | Odell | Aug. 18, 1953 |
| 2,653,996 | Wright | Sept. 29, 1953 |
| 2,700,502 | Hamilton | Jan. 25, 1955 |
| 2,706,215 | Van Duuren | Apr. 12, 1955 |
| 2,721,318 | Barker | Oct. 18, 1955 |

FOREIGN PATENTS

| | | |
|---|---|---|
| 221,341 | Germany | Jan. 3, 1909 |

UNITED STATES PATENT OFFICE

CERTIFICATE OF CORRECTION

Patent No. 2,917,578 December 15, 1959

Richard C. Curtis et al.

It is hereby certified that error appears in the printed specification of the above numbered patent requiring correction and that the said Letters Patent should read as corrected below.

Column 4, line 32, for "incdluded" read -- included --; column 13, line 31, for "pages" read -- page --; column 14, line 31, for "ocur" read -- occur --; column 15, line 37, for "message-coke" read -- message-code --; column 16, line 62, for "signal" read -- single --; line 66, for "transmitter" read -- transmitted --; column 17, line 15, for "groups:" read -- groups; --; line 53, strike out "generator"; column 19, line 4, for "single- digit" read -- single-digit --; line 7, for "second-generating" read -- second signal-generating --; line 40, for "reproducting" read -- reproducing --.

(SEAL) Signed and sealed this 11th day of October 1960.

Attest:

KARL H. AXLINE
Attesting Officer

ROBERT C. WATSON
Commissioner of Patents